Figure 1:
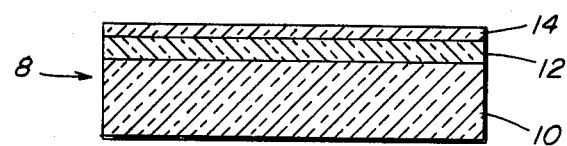

United States Patent [19]

Gordon

[11] Patent Number: 4,690,871
[45] Date of Patent: Sep. 1, 1987

[54] PROTECTIVE OVERCOAT OF TITANIUM NITRIDE FILMS

[76] Inventor: Roy G. Gordon, c/o Thompson Birch, Gauthier & Samuels 225 Franklin St., Boston, Mass. 02110

[21] Appl. No.: 837,774

[22] Filed: Mar. 10, 1986

[51] Int. Cl.$^4$ ............................................. C03C 17/00
[52] U.S. Cl. ...................................... 428/432; 65/60.1; 65/60.2; 65/60.51; 65/60.53
[58] Field of Search .................... 65/60.1, 60.2, 60.51, 65/60.53; 427/109, 160, 163, 166; 428/432

[56] References Cited

U.S. PATENT DOCUMENTS

| | | | |
|---|---|---|---|
| 3,674,453 | 7/1972 | Loukes et al. | 65/60.51 X |
| 4,123,244 | 10/1978 | Leclercg et al. | 65/60.1 |
| 4,329,379 | 5/1982 | Terneu et al. | 65/60.2 X |
| 4,535,000 | 8/1985 | Gordon | 65/60.1 |
| 4,562,093 | 12/1985 | Mario et al. | 427/109 |

FOREIGN PATENT DOCUMENTS 0204693 12/1983 German Democratic Rep. ................................. 427/166

*Primary Examiner*—Arthur Kellogg
*Attorney, Agent, or Firm*—Andrew F. Kehoe

[57] ABSTRACT

Transparent glass sheets comprising thereon titanium-nitride as the principal solar screening layer for reducing transmission of near infrared and, thereover, a layer of tin oxide of about 300 to 800 angstroms thick. The tin oxide layer serves to protect the titanium nitride from oxidation during high-temperature processing procedures, increases the abrasion-resistance, and at roughly the midpoint of the 300 to 800 angstrom range, is useful in reducing the color and visible reflectivity properties of some titanium nitride films. In practice, some of the tin oxide, that is not required for physical protection of the TiN or visual effect, can be positioned between the nitride and the glass substrate.

16 Claims, 2 Drawing Figures 4,690,871

PROTECTIVE OVERCOAT OF TITANIUM NITRIDE FILMS

BACKGROUND OF THE INVENTION

This invention relates to the improvement of titanium nitride films, particularly those used in shielding windows from excessive heat gain during warm weather.

It has also been proposed in U.S. Pat. No. 3,885,855 to produce solar control films by reactive sputtering of the nitrides, carbides or borides of the metals titanium, zirconium, hafnium, vanadium, niobium, tantalum, chromium, molybdenum, or tungsten. While effective optical properties were known for some of these materials, any large-scale production of architectural glass by the vacuum electrical method of reactive sputtering would be rather slow and expensive.

Control of the solar energy coming into windows is important in maintaining comfortable indoor conditions in warm climates. Solar control has been achieved commonly by adding light-responsive colorant material to the glass. Tinting of glass in this way has disadvantages in production, however, since a long time may be required to change shades. More recently, reflecting and absorbing films have been applied to clear glass, to achieve solar control. Reflection of unwanted radiation is more efficient than absorption, since reflection eliminates the radiation completely, whereas part of the absorbed heat is eventually carried into the building.

In U.S. Pat. No. 4,535,000 issued on Aug. 12, 1985, (incorporated herein by reference) Roy G. Gordon disclosed a rapid process for deposition of transparent solar screens of titanium nitride while avoiding haze and imperfections on the sheet being coated. Such problems could have been caused by premature, powder-forming condensation of reactants in reactor conduits.

There are a large number of other procedures and products characterized by the deposition of titanium nitride on substrates. Most of these relate to wear-resistant layers of the nitride which, because of their thickness, render the film opaque. All questions of light transmission or optical quality of such materials are not applicable to such materials and procedures.

The improvements in titanium nitride deposition procedures did not avoid some inherent problems in achieving broad acceptance of TiN as a glass-coating material in such markets as architectural glass. These problems included some susceptibility to mechanical and chemical attack and some limitations with respect to visual characteristics of TiN film. The invention described below arose out of work directed to the solving of these problems.

SUMMARY OF THE INVENTION

A principal object of the invention is to provide an oxidation-resistant protective layer over a thin, transparent, titanium-nitride-bearing film.

Another object of the invention is to provide oxidation protection of TiN film during high-temperature processing of glass sheets upon which the film has been deposited.

Other object of the invention is to provide a titanium nitride-based solar film which has excellent abrasion resistance.

Still further objects of the invention are to provide solar-control products having superior light-attenuating characteristics, particularly reduced visible reflectivity and reduced color.

Another object of the invention is to provide an improved and more efficient process for using TiN as a solar shield on architectural windows, to reduce the solar heat gain during hot weather.

Other objects of the invention will be apparaent to those skilled in the art on their reading of this disclosure.

The above objects have been substantially achieved by coating newly-formed solar screens bearing titanium nitride film as the principal barrier to near infrared radiation with a thin coating of a protective transparent film, advantageously tin oxide. Other protective film means may be used. For example silicon oxide, and aluminum oxide also have good protective properties. However, tin oxide, particularly fluorine-doped tin oxide, is believed to have the most favorable combination of mechanical, optical, and infrared emissivity properties to complement solar-shield applications.

The titanium nitride can be replaced as the primary solar absorption film, in whole or in part, with solar screening nitrides such as hafnium nitride, zirconium nitride or the like. Titanium nitride coating, however, is the most advantageous choice for most applications because of the relative ease with which gaseous precursors to the coating can be formed and handled on processing equipment.

The thinner tin oxide films, i.e, those of about 500 angstroms thick, are preferable for use on high-light-transmission glass sheets, e.g., those over a 300 angstrom thick TiN film. An example would be primary vision areas of automotive glass which would have a visible light transmission of about 70%. In such an instance, total solar transmission would be about 50%.

In lower-transmission applications (e.g., an automotive sun roof or architectural glass), a titanium nitride thickness of about 600 to 1000 angstroms, again in combination with a 500 angstrom overcoat film of tin oxide, would provide a highly-suitable combination for obtaining a 15% visible transmission and 8% transmission of total solar transmission.

Among preferred products of the invention are transparent glass sheets comprising thereon titanium-nitrate as the principal solar screening layer for reducing transmission of near infrared and, thereover, a layer of tin oxide of about 300 to 800 angstroms thick. The tin oxide layer serves to protect the titanium nitride from oxidation during high-temperature processing procedures, increases the abrasion-resistance, and, at 500 angstroms or roughly the midpoint of the 300 to 800 angstrom range, is useful in reducing the color and reflectivity properties of some titanium nitride films. In practice, some of the tin oxide, that is not required for physical protection of the TiN or visual effect, can be positioned between the nitride and the glass substrate.

The performance of these compound solar-control coatings is only slightly dependent on the glass substrate on which they are placed. However, more exact values of optimum thickness can be determined for an individual application of the invention after one selects a particular substrate and the desired parameters for emissivity and solar transmission values.

In one highly advantageous application of the invention, the titanium-nitride based coating is sandwiched between two protective oxide coatings, e.g., two tin-oxide coatings. In such systems, the titanium nitride film serves the principal function of reducing near-infrared (wavelengths of from about 0.7 to 2 microns) transmission. The outer layer of tin oxide serves to increase the abrasion resistance and serves as an oxidation-protective layer during manufacture, after the coating operation itself, in subsequent, high-temperature fabrication steps such as annealing, tempering or bending processes.

The inner layer of tin oxide, that layer positioned between the glass substrate and the titanium nitride, promotes a desirably uniform nucleation of the titanium nitride during the deposition of TiN and serves to insulate the TiN from any undesirable chemical interaction with the glass substrate.

Both tin oxide layers serve to increase the ratio of transmission of visible light to the transmission of near infrared light because of their high refractive index. The tin oxide films are also particularly effective in reducing emissivity (reflecting farinfrared) when they have been fluorine-doped according to manufacturing procedures known in the art. In some advantageous products, the tin oxide films total about 1000 angstroms in thickness. For example, each tin oxide film may be about 5000 angstroms thick.

Thicker TiN films, those with otherwise highly desirable shading characteristics for some architectural use, have, taken alone on a glass substrate, reflection characteristics which are aesthetically undesirable.

Thus, TiN films of about 1750 angstroms in thickness have an almost mirror-like bluish reflection color from the coated side. This is particularly true when the coating is formed according to the process described by Gordon in U.S. Pat. No. 4,535,000, i.e., by reacting ammonia and titanium chloride. When a tin oxide film of about 575 angstroms is placed on top of the TiN, the reflected color becomes virtually undetectable to most observers. Indeed, the highly reflective nature of the transparent sheet also drops markedly, roughly approximating the reflectance of untreated architectural glass. Such reflection-diminished film will have a visible transmission of about 5–6% with a total solar transmission that is even lower.

While the products of the invention are highly advantageous in use because of their optical and solar-shielding properties, and the superior abrasion resistance of tin oxide relative to TiN the use of a tin oxide coating is particularly important in processing procedures. Thus, for example, transparent glass products prepared according to the invention can be annealed at typical glass-plate annealing temperatures of about 1100° F. for an hour without any significant, or even detectable, oxidation of the solar-control film. Similarly, tempering at temperatures of about 1150° F. for five minutes results in no deterioration of the product. Similar testing was carried out by measuring the contact resistance between the tin oxide film, through the TiN layer, to a silicon substrate. Any oxidation of the TiN would have resulted in a large increase in the electrical contact resistance measured during the test.

Another important process aspect of the invention is the conservation of titanium nitride which would otherwise be lost to oxidation during the process of coating hot glass with TiN according to such high-temperature procedures as are illustrated by the process disclosed in U.S. Pat. No. 4,535,000. In such a procedure, and assuming the titanium nitride film would take about 20 seconds to move 10 feet from the exit of the tin float bath to the tin oxide over coating, then about 100 to 150 angstroms of the top surface of titanium oxide could be oxidized to titanium oxide. Such a loss of TiN can often be tolerated or compensated for. But, it introduces a wholly unnecessary variable into the process.

The tin oxide is of particular value in avoiding the above-described loss of nitride during the coating operation. Such conversion of nitride to oxide also introduces another variable into the product and may result in color variations in product as it is subjected to post-coating annealing and tempering. The tin oxide offers particular value in protecting the newly-formed TiN from oxidation during annealing and tempering operations at temperatures exceeding 800° F. and, typically between 1000° and 1200° F.

Consequently, the overcoating of the nitride with tin oxide is advantageously carried out in the nonoxidizing atmosphere of the tin bath structure in which the glass sheet to be coated is formed. This procedure allows the required amount of nitride to be used more efficiently as a solar shield and to be deposited more rapidly because no significant allowance need be made for oxidation.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 2:
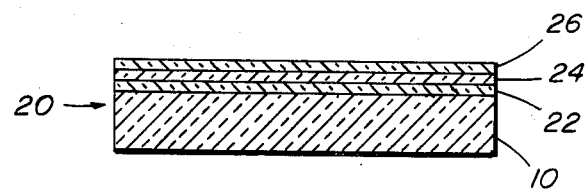

FIGS. 1 and 2 illustrate schematically specific embodiments of the invention.

FIG. 1 illustrates a transparent solar-shield product 8 suitable for use as architectural glass and comprising a soda lime glass substrate 10, a coating of about 1500 angstroms TiN 12, and a coating of 400 angstroms of fluorine-doped tin oxide 14.

FIG. 2 illustrates another solar-shield product 20. The glass 10 is coated with 500 angstroms of fluorine-doped tin oxide (layer 22), 700 angstroms of TiN (layer 24) and 400 angstroms of tin oxide (layer 26). The coatings are achieved using reactant systems known in the art, i.e., those described in U.S. Pat. Nos. 4,535,000 and 4,265,974 for TiN and $SnO_2$ respectively.

The titanium nitride deposited on the glass of FIGS. 1 and 2 is deposited according to the process described in U.S. Pat. No. 4,535,000. The tin oxide, is a fluorine-doped oxide and deposited according to the process described in U.S. Pat. No. 4,146,657.

The structure according to FIG. 1 was modified by replacing the tin oxide with silicon oxide, in one instance, and aluminum oxide in another instance. Both of these oxides were good protective coatings.

It is also to be understood that the following claims are intended to cover all of the generic and specific features of the invention herein described and all statements of the scope of the invention which might be said to fall therebetween.

What is claimed is:

1. A solar screening transparent sheet product characterized by oxidation resistance even during annealing, tempering, bending or other processes at temperatures above about 800° F., said product having:
  (a) an exterior film of tin oxide forming means to mechanically and chemically protect a film of titanium nitride;
  (b) said film of titanium nitride under said tin oxide and forming the principal barrier to near infrared radiation of such product; and
  (c) a substrate of transparent glass under said film of titanium nitride.

2. A transparent sheet product as defined in claim 1 comprising a second film of tin oxide between said titanium nitride and said glass substrate.

3. A sheet product as defined in claim 1 wherein said exterior film of tin oxide is in a range of from about 300 to 800 angstroms thick.

4. A sheet product as defined in claim 1 wherein said exterior film of tin oxide is about 500 angstroms thick.

5. A sheet product as defined in claim 1 wherein said exterior film of tin oxide is a means to provide abrasion resistance superior to abrasion resistance of titanium nitride.

6. A sheet product as defined in claim 2 wherein each of said exterior film of tin oxide and said second film of tin oxide are about 500 angstroms thick and wherein said titanium nitride film is at least about 300 angstroms thick.

7. A sheet product as defined in claim 2 wherein said tin oxide films total about 1000 angstroms in thickness.

8. A sheet product as defined in claim 2 wherein said exterior film of tin oxide and said second film of tin oxide are about 500 angstroms thick and wherein said titanium nitride film is about 700 angstroms thick.

9. A sheet product as defined in claim 1 wherein said titanium nitride layer is sufficiently thick to exhibit a colored reflection characteristic when said nitride layer is uncoated and wherein said exterior film of tin oxide is of a thickness effective to substantially reduce said colored reflection characteristics in said sheet product.

10. A product as defined in claim 9 wherein said nitride film is about 1700 angstroms thick, wherein said exterior film of tin oxide is at least about 500 angstroms thick.

11. A process for making a transparent sheet product comprising a layer of titanium nitride as a means to reduce near infrared radiation from penetrating the coated glass, said process comprising the steps of:
  (a) coating said glass with an effective thickness of titanium nitride forming means to reduce passage of said near infrared radiation; and
  (b) thereupon overcoating said titanium nitride with a coating from 300 to 800 angstroms of tin oxide.

12. A process for making an annealed transparent sheet product comprising a layer of titanium nitride as a means to reduce near infrared radiation from penetrating the coated glass, said process comprising the steps of:
  (a) coating said glass with an effective thickness of titanium nitride forming means to reduce passage of said near infrared radiation;
  (b) thereupon overcoating said titanium nitride with a coating from 300 to 800 angstroms of tin oxide; and
  (c) and annealing said glass sheet at a temperature in excess of 1000° F.

13. A process for making a tempered transparent sheet product comprising a layer of titanium nitride as a means to reduce near infrared radiation from penetrating the glass, said process comprising the steps of:
  (a) coating said glass with an effective thickness of titanium nitride forming means to reduce passage of said near infrared radiation;
  (b) thereupon overcoating said titanium nitride with a coating from 300 to 800 angstroms of tin oxide; and
  (c) and tempering said glass sheet at a temperature in excess of 1000° F.

14. A process as defined in claim 8 wherein said coating and overcoating steps are carried out within the reducing atmosphere of a tin float bath enclosure of a float glass production line and upon glass sheet formed in said tin float bath.

15. A solar screening transparent sheet product characterized by oxidation resistance even during annealing, tempering, bending or other processes at temperatures above about 800° F., said product having:
  (a) an exterior film of a protective oxide selected from tin, silicon, and aluminum oxides or mixtures thereof forming means to mechanically and chemically protect a film of titanium nitride;
  (b) said film of titanium nitride under said protective oxide and forming the principal barrier to near infrared radiation of such product; and
  (c) a substrate of transparent glass under said film of titanium nitride.

16. A sheet product as defined in claim 15 wherein said protective oxide is tin oxide.

* * * * *

UNITED STATES PATENT AND TRADEMARK OFFICE
CERTIFICATE OF CORRECTION

PATENT NO. : 4,690,871

DATED : September 1, 1987

INVENTOR(S) : Roy G. Gordon

It is certified that error appears in the above-identified patent and that said Letters Patent is hereby corrected as shown below:

Column 3, line 22, "5000" should read -- 500 --.

Signed and Sealed this

Second Day of February, 1988

Attest:

DONALD J. QUIGG

Attesting Officer

Commissioner of Patents and Trademarks